(12) United States Patent
Heinz et al.

(10) Patent No.: US 12,013,461 B2
(45) Date of Patent: Jun. 18, 2024

(54) 3D TIME OF FLIGHT CAMERA

(71) Applicant: SICK AG, Waldkirch (DE)

(72) Inventors: Matthias Heinz, Waldkirch (DE); Simon Braun, Waldkirch (DE); Alexander Emperle, Waldkirch (DE); Thomas Dieng, Waldkirch (DE)

(73) Assignee: SICK AG, Waldkirch (DE)

( * ) Notice: Subject to any disclaimer, the term of this patent is extended or adjusted under 35 U.S.C. 154(b) by 158 days.

(21) Appl. No.: 17/850,330

(22) Filed: Jun. 27, 2022

(65) Prior Publication Data

US 2022/0413155 A1 Dec. 29, 2022

(30) Foreign Application Priority Data

Jun. 28, 2021 (DE) ............................. 102021116651.9

(51) Int. Cl.
*G01S 17/894* (2020.01)
*G01S 17/42* (2006.01)
*G01S 17/931* (2020.01)
*H04N 13/207* (2018.01)
*H04N 13/296* (2018.01)
*H04N 23/56* (2023.01)
*H04N 23/74* (2023.01)

(52) U.S. Cl.
CPC ............ *G01S 17/894* (2020.01); *G01S 17/42* (2013.01); *G01S 17/931* (2020.01); *H04N 13/207* (2018.05); *H04N 13/296* (2018.05); *H04N 23/56* (2023.01); *H04N 23/74* (2023.01)

(58) Field of Classification Search
None
See application file for complete search history.

(56) References Cited

U.S. PATENT DOCUMENTS

| | | | |
|---|---|---|---|
| 2005/0103867 A1* | 5/2005 | Zhu | G06K 7/10851 235/462.45 |
| 2006/0278711 A1* | 12/2006 | Zhu | G06K 7/10712 235/462.31 |
| 2015/0312983 A1 | 10/2015 | Hu et al. | |
| 2017/0289422 A1* | 10/2017 | Shih | H04N 5/2621 |
| 2019/0170878 A1* | 6/2019 | Munro | G01S 17/18 |

FOREIGN PATENT DOCUMENTS

| | | |
|---|---|---|
| DE | 102011112455 A1 | 3/2013 |
| DE | 102014105482 B4 | 1/2020 |

OTHER PUBLICATIONS

German Search Report for corresponding application 102021116651.9 issued May 23, 2022.

* cited by examiner

*Primary Examiner* — Talha M Nawaz
(74) *Attorney, Agent, or Firm* — Nath, Goldberg & Meyer; Jerald L. Meyer

(57) ABSTRACT

In order to enable high image acquisition rate with simultaneous low energy consumption of a camera 1, a camera (1), in particular a 3D time-of-flight camera, is provided, comprising an illumination unit (2) which emits light pulses during an illumination phase (Bp), an image sensor (3) which generates images from the light pulses reflected by an object, a switching controller (4) which controls current to the illumination unit (2), the switching controller (4) being operable in a continuous and a discontinuous mode (CCM; DCM), and a control unit (5) which is designed to activate and deactivate the continuous mode (CCM) of the switching controller (4) as a function of the illumination phase (Bp) of the illumination unit (2).

6 Claims, 1 Drawing Sheet

3D TIME OF FLIGHT CAMERA

FIELD

The invention relates to a camera, in particular a 3D time-of-flight camera with an illumination unit that emits light pulses, an image sensor, a switching controller that controls current to the illumination unit and a control unit.

BACKGROUND

Such a camera preferably operates according to a sensing principle in which a light beam is emitted as light pulses into a monitored area and the light beam reflected back by an object is received back, and the received signal is then evaluated electronically. This enables the camera to measure a distance and thus obtain depth information.

In particular, a 3D image, a distance image or a depth map are generated from the acquired three-dimensional image data with distance or range values for the individual pixels. Various methods are known for determining the depth information. These often involve measuring the time of flight of light using a known phase or pulse method to determine the distance of a probed object. These methods are also called TOF (Time-Of-Flight) or LIDAR (Light Detection And Ranging).

3D image data obtained in this way can be used in automation technology to control moving actuators, such as robots or vehicles.

In the case of vehicles operating on public roads or in closed environments, especially in the field of factory and logistics automation, a 3D time-of-flight camera shall be used to record the entire environment and, in particular, a planned route as completely as possible and three-dimensionally. This applies to virtually all conceivable vehicles, be they those with drivers such as cars, trucks, work machines and forklifts, or driverless vehicles such as AGVs (Automated Guided Vehicles), AGCs (Automated Guided Carts), AMRs (Autonomous Mobile Robots) or industrial trucks.

The 3D image data are used, for example, to assist a driver or enable autonomous navigation, including detecting obstacles, avoiding collisions, or facilitating the loading and unloading of transport goods, including boxes, pallets, containers, or trailers.

When using 3D time-of-flight cameras in one of the mobile applications mentioned above, an energy consumption of the 3D time-of-flight camera is crucial for a runtime of the mobile vehicle. Here, the illumination of the 3D time-of-flight camera for generating the 3D depth information and thus also its power supply contributes a large part to the energy consumption.

In the TOF method mentioned above, several measurements are required for phase estimation. For this purpose, the illumination is continuously switched on and off, which leads to load jumps in the energy supply of the illumination of the 3D time-of-flight camera. Due to readout and processing phases of the depth data, lighting pauses occur in which no or only low load is generated in the energy supply of the lighting of the 3D time-of-flight camera.

To control the power supply of the illumination of the 3D time-of-flight camera, switching controllers are used which can be operated in a continuous mode (also called continuous current mode "CCM") or in a discontinuous mode (also called discontinuous current mode "DCM").

In continuous mode, the switching controller ensures a continuous power supply to the illumination of the time-of-flight 3D camera, even if the illumination of the time-of-flight 3D camera does not emit a light pulse. In discontinuous mode, the switching controller is designed to supply power to the illumination of the 3D time-of-flight camera only for emitting the light pulse and to be de-energized outside an illumination phase. As a result, the switching controller has a poor response to load jumps, which leads to losses in the measurement performance of the 3D time-of-flight camera.

SUMMARY

It is an object of the invention to provide a camera with high image capture while consuming low power.

This object is solved by a camera, in particular a 3D time-of-flight camera, in particular a 3D time-of-flight camera, which comprises an illumination unit which emits light pulses during an illumination phase, an image sensor which generates images from the light pulses reflected by an object, a switching controller which controls current to the illumination unit, it being possible to operate the switching controller in a continuous and a discontinuous mode, and a control unit which is designed to activate and deactivate the continuous mode of the switching controller as a function of the illumination phase of the illumination unit.

This results in the technical advantage that a supply voltage applied to the switching controller does not change and thus different supply levels do not occur, since a switching from continuous mode to discontinuous mode and vice versa is carried out within the switching controller.

According to a preferred embodiment, the control unit activates the continuous mode of the switching controller before the lighting unit is switched on and deactivates the continuous mode of the switching controller after the lighting unit is switched off. In this way, it is possible to provide the full current for the lighting unit at the beginning of the lighting phase, so that a constant lighting pattern can be achieved.

Advantageously, the control unit activates the discontinuous mode between two illumination phases of the illumination unit, which minimizes power dissipation by the switching controller per se, whereby no regulation of the supply voltage of the switching controller is necessary.

Preferably, the illumination phase of the illumination unit consists of an envelope curve that ranges from microseconds to milliseconds and envelopes light pulses lying in a range of nanoseconds. Herein, activation of the continuous mode of the switching controller enables implementation of a fast illumination pattern of the 3D time-of-flight camera. Furthermore, the activation of the discontinuous mode between the illumination phases enables a high possible saving of power dissipation of the switching controller.

According to a preferred embodiment, the control unit is integrated in the image sensor so that a compact design of the 3D time-of-flight camera is possible.

Advantageously, the control unit is provided for controlling the illumination phases of the illumination unit. This means that a single control unit can be provided to control the switching controller, the illumination unit and the image sensor, further improving the compactness of the time-of-flight 3D camera.

The camera according to the invention can be further embodied in a similar manner, showing similar advantages. Such advantageous features are described by way of example, but not exhaustively, in the dependent claims following the independent claim.

BRIEF DESCRIPTION OF THE DRAWINGS

The invention is also explained in more detail below with respect to further features and advantages by way of example with reference to embodiments and with reference to the accompanying drawing. The figures of the drawing show in.

DETAILED DESCRIPTION

Figure 1:
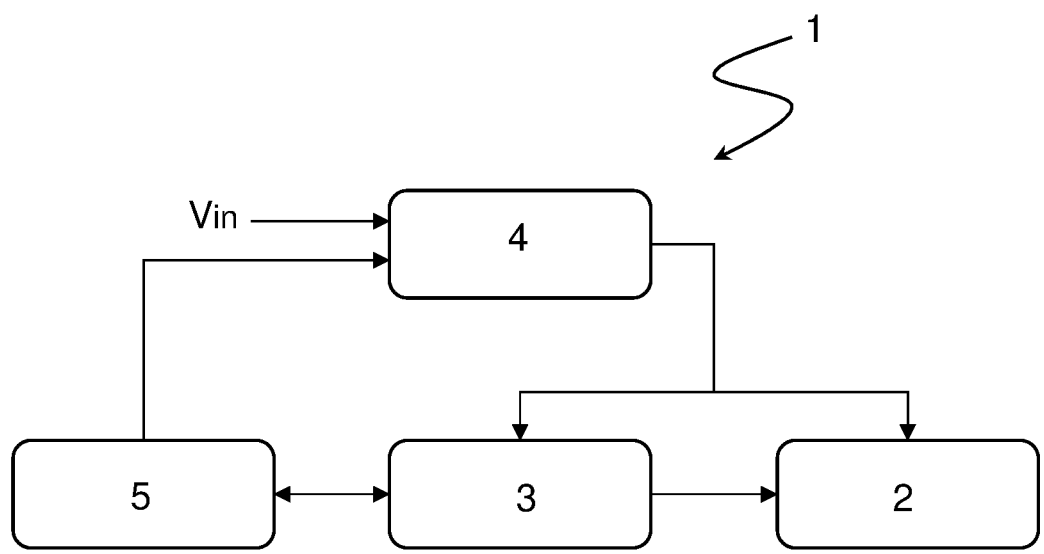
FIG. 1 a schematic representation of a preferred embodiment of a circuit diagram of a camera according to the invention, and FIG. 2 a schematic representation of an operating sequence of the camera according to the invention over time.

FIG. 1 shows a schematic representation of a preferred embodiment of a circuit diagram of a camera 1 according to the invention, which comprises in particular a 3D time-of-flight camera in which a TOF detection method is used.

Figure 2:
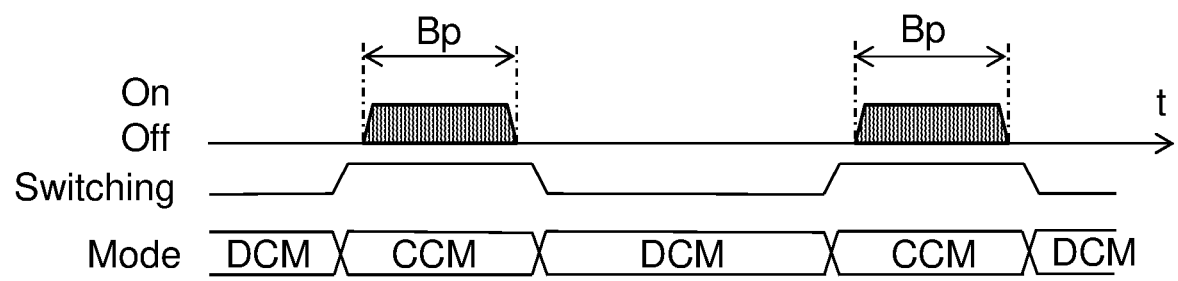

The camera 1 comprises an illumination unit 2, which is provided to emit light pulses for illuminating a monitoring area during an illumination phase Bp (shown in FIG. 2). Furthermore, an image sensor 3 is provided which generates images from the light pulses reflected from an object not shown. The images represent in particular a 3D image, a distance image or a depth map.

Furthermore, the camera 1 comprises a switching controller 4 that controls current to the illumination unit 2, wherein the switching controller 4 is operable in a continuous mode, referred to as CCM, or a discontinuous mode, referred to as DCM. That is, the switching controller 4 is configured to be switchable between the continuous mode CCM and the discontinuous mode DCM and vice versa.

According to the invention, the camera 1 comprises a control unit 5 configured to activate and deactivate the continuous mode CCM of the switching controller 4 depending on the illumination phase Bp of the illumination unit 2. By activating the continuous mode CCM of the switching controller 4, in particular immediately before a start of the illumination phase Bp of the illumination unit 2, the switching controller 4 is able to provide the full current to the illumination unit 2 for the illumination phase Bp.

Deactivating the continuous mode CCM or activating the discontinuous mode DCM of the switching controller 4 after the illumination phase Bp of the illumination unit 2 prevents high power dissipation in the switching controller 4, since the current provided by the discontinuous mode DCM may be sufficient for the image sensor 3 to evaluate the acquired image data, for example.

In addition, switching internally of the switching controller 4 between these two modes CCM and DCM allows a supply voltage Vin applied to the switching controller 4 to be unaffected.

As shown in FIG. 1, the switching controller 4 can also be provided to regulate current to the image sensor 3. This allows the control unit 5 to regulate the current to the illumination unit 2 and to the image sensor 3 more easily via the switching controller 4. However, such a design is not mandatory, since current control of the image sensor 3 independently of the switching controller 4 can also be advantageous.

As shown in FIG. 2, an operational sequence of the camera 1 or the switching controller 4 of the camera 1 runs over time t as follows:

When the supply voltage Vin is applied, the switching controller 4 is in the discontinuous mode DCM. Before the start of the illumination phase Bp of the illumination unit 2, the control unit 5 of the camera 1 switches the switching controller 4 to the continuous mode CCM, so that at the start of the illumination phase Bp of the illumination unit 2, the full current is available for the illumination unit 2 in order to ensure sufficient and stable illumination for a capture of the images by the image sensor 3.

After the end of the illumination phase Bp of the illumination unit 2, the control unit 5 deactivates the continuous mode CCM of the switching controller 4 and switches the switching controller 4 to the discontinuous mode DCM. As a result, no full amount of current is present in the switching controller 4, so that power dissipation can be avoided.

Further, the current provided by the discontinuous mode DCM may be sufficient for the image sensor 3 to process and analyze the captured image data, thereby avoiding an image capture delay. Avoiding the delay in image acquisition enables an improvement in the efficiency of the camera 1.

Between two illumination phase Bp of the illumination unit 2, the switching controller 4 is in the discontinuous mode DCM, so that the power dissipation of the switching controller 4 can be significantly reduced, since this intermediate phase is much longer than the illumination phase Bp, which is preferably represented by an envelope curve ranging from microseconds to milliseconds, e.g. 500 µs, and enveloping light pulses lying in a range of nanoseconds, e.g. 3 ns.

As soon as the control unit 5 activates the illumination unit 2 again directly or (as shown) indirectly via the image sensor 3 in order to restart the illumination phase Bp, the control unit 5 activates the continuous mode CCM of the switching controller 4, so that the switching controller 4 again switches to the continuous mode CCM and deactivates the discontinuous mode DCM.

The illumination unit 2 thus receives the full current to emit the light pulse(s) with the start of the illumination phase Bp. The switching controller 4 thus has no dead time, so that the efficiency of the camera 1 is further improved.

LIST OF REFERENCE SIGNS

1 Camera
2 Lighting unit
3 Image sensor
4 Switching controller
5 Control unit
Bp Lighting phase
DCM discontinuous mode
CCM continuous mode
T Time
Vin Supply voltage

The invention claimed is:

1. A 3D time-of-flight camera, comprising:
an illumination unit (2) that emits light pulses during an illumination phase (Bp);
an image sensor (3) that generates images from the light pulses reflected from an object;
a switching controller (4) that controls current to the illumination unit (2), the switching controller (4) being operable in a continuous and a discontinuous mode (CCM; DCM); and
a control unit (5) designed to activate and deactivate the continuous mode (CCM) of the switching controller (4) as a function of the illumination phase (Bp) of the illumination unit (2),
wherein, before a start of the illumination phase (Bp), the control unit switches the switching controller to the continuous mode (CCM), so that at the start of the illumination phase (Bp) of the illumination unit, a full current is available for the illumination unit to ensure sufficient and stable illumination for a capture of the images by the image sensor, and after the end of the illumination phase (Bp), the control unit switches the switching controller to the discontinuous mode (DCM), so as to decrease power dissipation of the switching controller to enable high image acquisition rate with simultaneous low energy consumption of a camera.

2. The 3D time-of-flight camera of claim 1, wherein the control unit (5) activates the continuous mode (CCM) of the switching controller (4) before a switch-on of the illumination unit (2) and deactivates it after a switch-off of the illumination unit (2).

3. The 3D time-of-flight camera of claim 1, wherein the control unit (5) activates the discontinuous mode (DCM) between two illumination phases (Bp) of the illumination unit (2).

4. The 3D time-of-flight camera of claim 1, wherein the illumination phase (Bp) of the illumination unit (2) is represented by an envelope curve that ranges from microseconds to milliseconds and envelopes light pulses lying in a range of nanoseconds.

5. The 3D time-of-flight camera of claim 1, wherein the control unit (5) is integrated in the image sensor (3).

6. The 3D time-of-flight camera of claim 1, wherein the control unit (5) is provided for controlling the illumination phases (Bp) of the illumination unit (2).

* * * * *